(12) United States Patent
Austnes

(10) Patent No.: US 6,383,364 B1
(45) Date of Patent: May 7, 2002

(54) METHOD FOR CATHODIC PROTECTION OF REINFORCED CONCRETE

(75) Inventor: Per Austnes, Alesund (NO)

(73) Assignee: Optiroc AS, Oslo (NO)

( * ) Notice: Subject to any disclaimer, the term of this patent is extended or adjusted under 35 U.S.C. 154(b) by 0 days.

(21) Appl. No.: 09/529,001

(22) PCT Filed: Sep. 30, 1998

(86) PCT No.: PCT/NO98/00284

§ 371 Date: Apr. 6, 2000

§ 102(e) Date: Apr. 6, 2000

(87) PCT Pub. No.: WO99/19540

PCT Pub. Date: Apr. 22, 1999

(30) Foreign Application Priority Data

Oct. 9, 1997 (NO) ................................................ 974654

(51) Int. Cl.⁷ ................................................. C23F 13/00
(52) U.S. Cl. ........................ 205/734; 205/739; 205/740
(58) Field of Search ................................. 205/734, 740, 205/739

(56) References Cited

U.S. PATENT DOCUMENTS 5,431,795 A * 7/1995 Moreland et al. ............ 252/503

FOREIGN PATENT DOCUMENTS

| EP | 0499438 A1 | 8/1992 |
| EP | 0581433 A1 | 2/1994 |
| WO | 9201824 A1 | 2/1992 |

* cited by examiner

*Primary Examiner*—Bruce F. Bell
(74) *Attorney, Agent, or Firm*—Wenderoth, Lind & Ponack, L.L.P.

(57) ABSTRACT

There is described a method of cathodic protection, electrochemical chloride extraction and realkalisation in reinforced concrete or similar materials, and also reinforcement and crack prevention in concrete (1), comprising the impressing of a direct voltage between the reinforcement in the concrete (1) and a conductive device which is brought into contact with the surface of the concrete (1), and wherein the crack preventing effect is obtained by embedding the device in fresh concrete. The method is characterised in that as conductive device/current distributors there is used a mat (3) of optionally coated, conductive carbon fibers produced by blowing, pressing, weaving or knitting so that the fibers lie in almost every direction, and wherein the fibers are of different thickness, wherein the mat further comprises electric conductors (4) in the form of bands or wires of conductive material which are placed over or under the mat (3) or are incorporated therein.

31 Claims, 2 Drawing Sheets

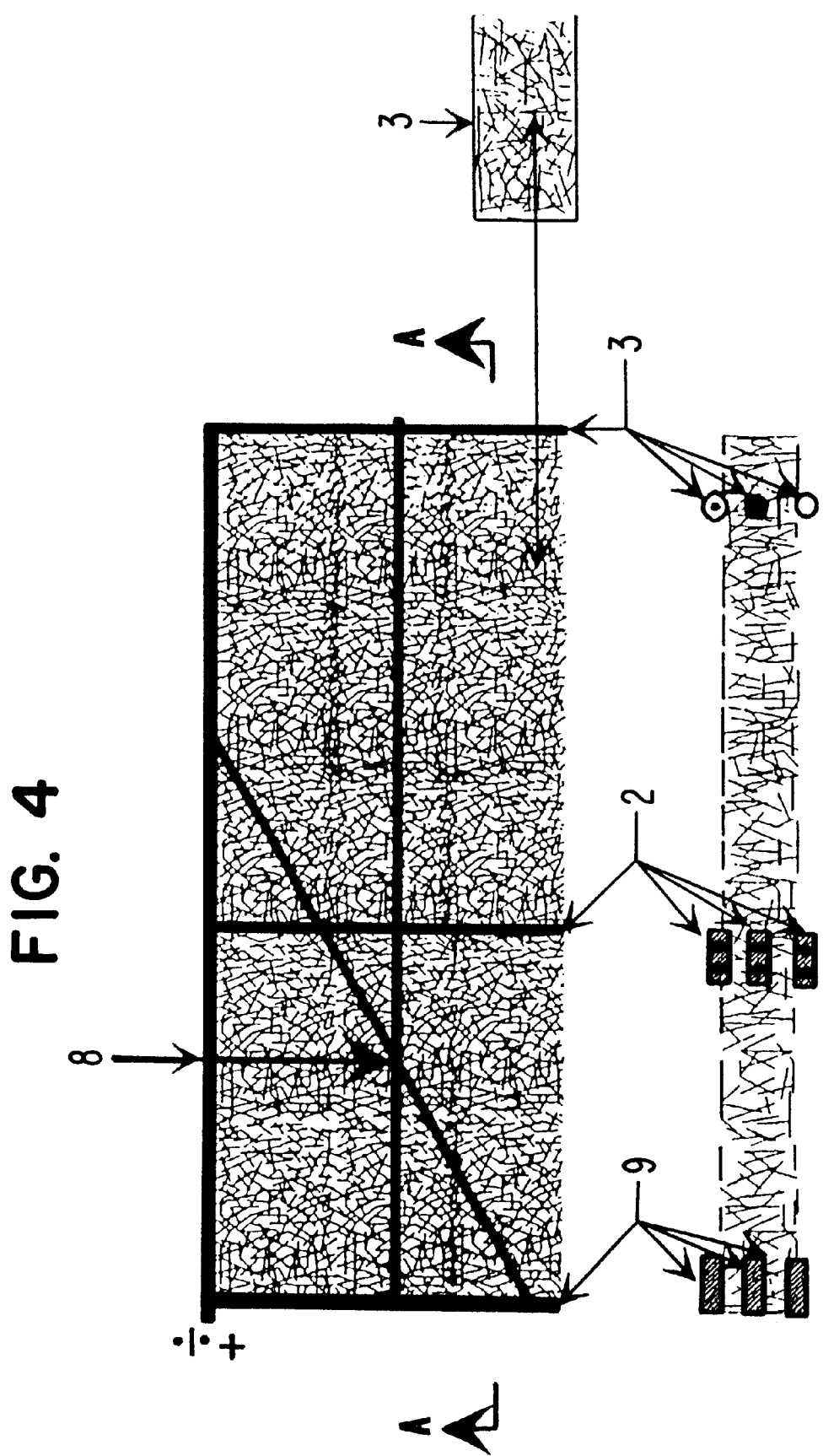

METHOD FOR CATHODIC PROTECTION OF REINFORCED CONCRETE

The present invention relates to a method for cathodic protection, electrochemical chloride extraction and realkalisation of reinforced concrete or similar materials, and also strengthening and crack prevention in concrete, comprising the impressing of a direct voltage between the reinforcement in the concrete and a conductive device which is placed on the concrete surface, and wherein crack prevention is achieved by embedding the device in fresh concrete.

BACKGROUND OF THE INVENTION

Today, corrosion of reinforcement in concrete structures is a major problem involving substantial maintenance costs. Corrosion is usually caused by chlorides, carbonisation or other changes in the environment surrounding the reinforcement where cracking is a major factor.

Electrochemical methods arm used ever-increasingly to protect the reinforcement against further corrosion. Methods used today include cathodic protection, chloride extraction and realkalisation. The principle common to these methods is that a direct voltage is impressed between the reinforcement, the cathode (negative pole), and various conductive devices which serve as the anode. This results in migration of ions in the concrete, formation of OH ions on the surface of the reinforcement or, in the case of cathodic protection, the potential impressed into the passive area. The anode may, for instance, be made of metal wire, metal mesh or conductive coatings which are placed on the surface of the concrete and incorporated therein to varying degrees. It is also possible to drill holes in which anode rods are inserted.

The use of, for example, wire cloths of valve metal for the same purpose as that of the present invention is previously known. Such solutions are described, for example, in NO B 169299, NO B 170291 and NO A 913222. According to these publications, the metal wires are welded together at their junctions. Clearly, this will result in a rigid and virtually inflexible cloth which is not easy to place on a surface that is to be treated. The use of these wire cloths is therefore limited.

NO B 162427 describes an anode comprising several wires which are connected to each other to form a flexible open cloth or netting. At least some of these wires are electrically conductive. According to this publication, the wires may connected to each other in a variety of ways. Among the characteristics of this cloth or netting is that it has a mesh size of at least 1.3 cm, preferably 5 cm, and that its fibres are not placed functionally in all directions. It also appears to be rather rigid in comparison with the present invention. When compared with the present invention, this anode yields a clearly limited capacity as regards current distribution and long-term durability. Tests have shown that when a coarse-meshed netting is used, the carbon wires become visible on the surface at a relatively early stage due to acid formation. As is commonly known, a system of this kind is broken down when acid is formed, and in particular when substantial current density is required.

GB A 2 175 609 describes an electrode having an enlarged area comprising one or more wires of valve metal in the form of a mesh, where the wires on the surface are provided with an anodic active layer. It is disclosed that the cloth may be woven or knitted, or that the wires may even be welded together. The material discussed in this publication is of a completely different type than the material used in the present invention. The material selection according to this publication results in a far more rigid product than that of the present invention.

NO 960841 describes 1–10% dispersed carbon fibres in a saturated epoxy/polyurethane mass (in the liquid phase). Flocking of the fibres results in an inhomogeneous distribution of the fibres, even at a content noticeably lower than 10%. The present invention differs substantially from this in that the amount, thickness and distribution may be designed in a premanufactured mat. Reference is also made to tests where the mat is incorporated in conductive coatings of dispersed fibres (see below). In this case, the current flow increased by a factor of seven or more.

A weakness of the aforementioned electrochemical methods is the anode system, or to be more precise, the current-carrying device. Several problems arise from this, including the following:

- corrosion on the current distribution device, particularly in cases of chloride extraction and realkalisation;
- repassivation of the current distribution device whereby the process comes to a stop;
- risk of the anode material drying out and fire in the case of methods employing a high current density, approximately 1 A/m$^2$ or more;
- the current distribution system often provides inadequate homogeneity of the current distribution on the surface. This applies inter alia to conductive coatings where there is liable to be an accumulation of fibres at some points on the surface, whilst at other points there is a minimum of fibres;
- the anode material is required to have good conductivity in order to prevent a drop in potential between the individual conductors;
- problems arise with the mechanical connection between intersecting current distribution bands, in particular with respect to durability and maintenance;
- existing systems take virtually no account of cracking.

SUMMARY OF THE INVENTION

The present invention provides a method of the type mentioned above which is characterised in that there is used as conductive device a mat of optionally coated, conductive carbon fibres produced by blowing, pressing, weaving or knitting so that the fibres lie in almost every direction and wherein the fibres are of different thicknesses, wherein the mat further comprises current conductors in the form of bands or wires of conductive material which are placed over or under the mat or which are incorporated therein.

The mat used according to the present invention may, for instance, be embedded in the concrete surface of a new structure in an exposed environment (see FIGS. 2 and 3). It is then possible to choose whether the system will later be used, if necessary, as a preventive system or as cathodic protection (CP) and where the costs involved will be minimal, The term "preventive CP" is used to mean the use of a lower impressed voltage than in normal CP where the electrical field acts as a shield against chloride penetration. The system will also to a great extent prevent shrinkage cracks, which is a major problem in structures of newly placed concrete.

The mat may also be used on existing structures where an electrically conductive material is placed on the surface of the structure (see FIG. 1).

For a person well versed in the art of cathodic protection, one of the difficulties encountered is that the structures are generally located in particularly exposed areas. The present system can be premanufactured under controlled conditions, which means that the installation phase will be very short and of little complexity.

The solution according to the present invention will also prevent the outbreak of fire in the anode material, which, for example, is a problem when using cellulose pulp in realkalisation and chloride extraction.

Embedment in fresh concrete allows the mat to be embedded so as to act as additional reinforcement in the surface layer of the concrete.

The system is so thin and flexible that it is easy to shape according to the surface and incorporate in an electrically conductive material. As mentioned, the mat may also be embedded close to the surface in new structures which are built of fresh concrete or shotcrete and connected to serve as cathodicprotection, should the need arise. It is also possible to use a lower voltage between the reinforcement and anode than in cathodic protection in order to produce a "shield" against chloride penetration for structures in particularly exposed areas. As is commonly known, the negatively charged chloride ions are repelled by the cathode and attracted to the anode, even at low voltages. The system would also be suitable for water drainage in concrete and for the removal of static electricity, as well as for surfaces where anti-static properties are required.

The current distribution is extremely homogeneous on the surface in comparison with known systems. In practice the same potential will be measured between randomly selected points on the surface.

The fact that the mat has such good conductivity on account of the short distance between the individual conductors allows a conductive anode material of much lower conductivity to be used. As a result, it is also possible to obtain a far higher current strength than in other systems with the same impressed voltage.

Another remarkable advantage with the system is that there is no need for mechanical connections of intersecting current distribution bands on the structure. The intersecting fibres are highly stable in the face of chemical breakdown.

BRIEF DESCRIPTION OF THE DRAWINGS

Reference will now be made to the attached figures, wherein:

FIG. 4 shows an example of how the electric conductors may be placed in the mat.

DETAILED DESCRIPTION OF THE INVENTION

Figure 1:
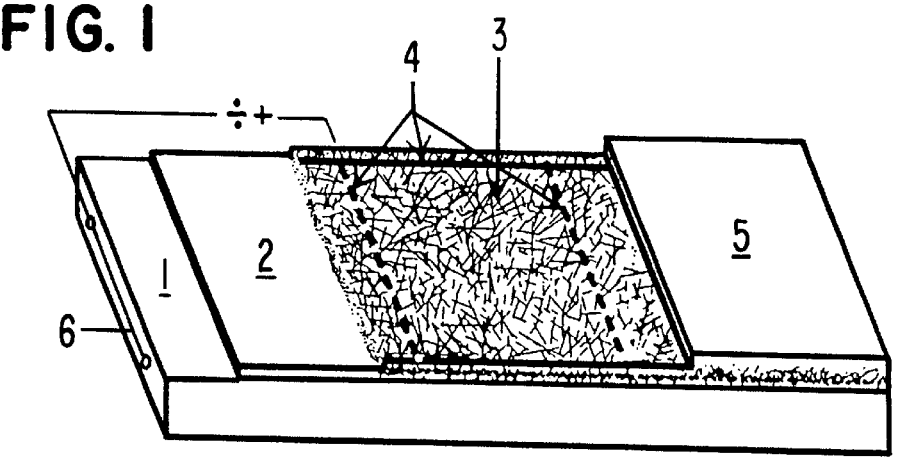
FIG. 1 shows an example of the mat used on an existing concrete surface.

FIG. 1 shows an example of the use of the mat (3) having electric conductors (4) wherein a layer of conductive material (2) is first applied to existing concrete surfaces (1) after the old concrete surface has been pretreated as necessary. The mat is then pressed into this layer. A spiked roller resembling a rolling wire brush may be used to ensure that the mat is well incorporated. Lastly, material is laid on top so as to obtain the necessary cover (5).

Figure 2:
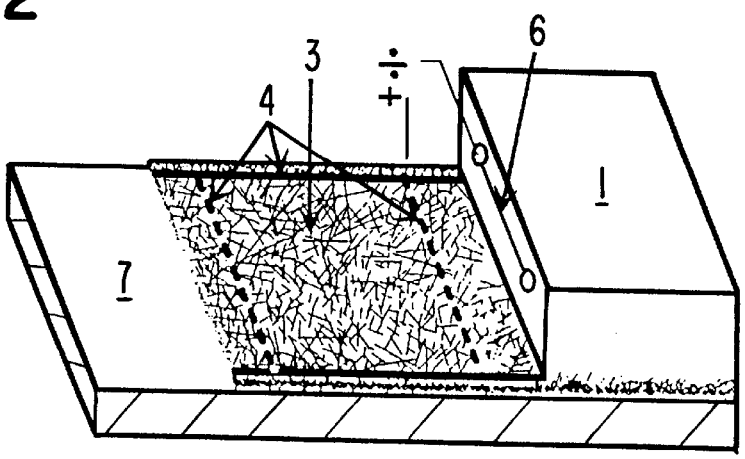
FIG. 2 shows an example of the mat used on formwork in connection with the placing of concrete.

FIG. 2 shows the mat placed directly on the formwork (7) after this has been cleaned and finished. It can be secured to the formwork at several points by means of, for example, a stapling machine so that it does not float up to the reinforcement (6) during the placing and vibration of fresh concrete on the surface (1).

Figure 3:
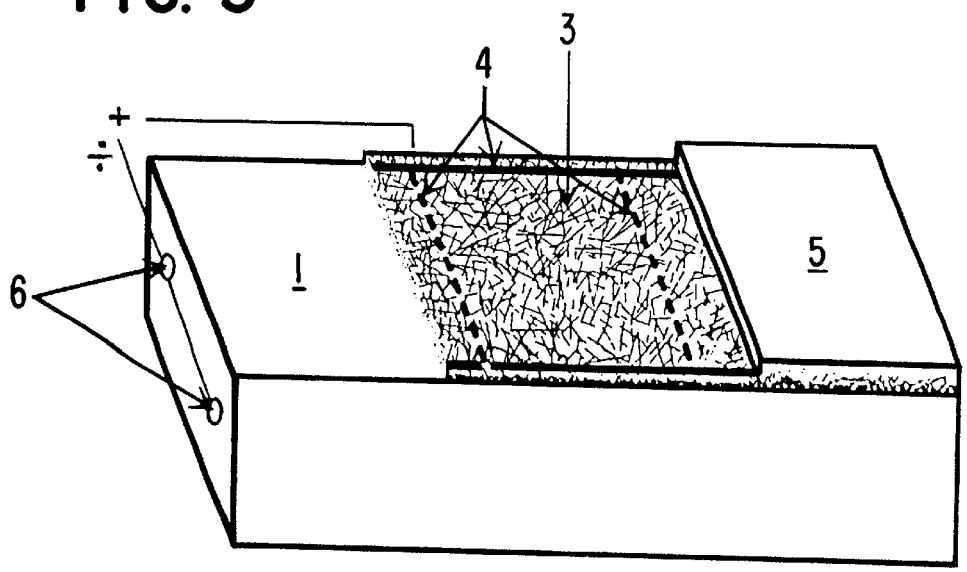
FIG. 3 shows an example of the mat used on the surface of fresh concrete.

FIG. 3 shows the use of the mat on the surface of fresh concrete. The mat (3) may either be pressed into the fresh concrete prior to surface treatment or encased in a layer of concrete (5) in the finishing stages of the concreting, and in this case the aforementioned roller may also be used. The wet cover (5) may also consist of another conductive material.

In the case of chloride extraction, the mat may be placed in a material of good electrical conductivity, for example, a gel. The same is done in the case of realkalisation, but the filler material is then alkaline.

FIG. 4 shows an example of how the electric conductors may be placed. These may consist of graphite strips or metal strips (titanium) (8), or pure graphite bands or bands having metal wires consisting of, for example, titanium or other conductive material (9), (2), (4) woven or spun therein. The bands and the wires may be placed over or under the mat or placed in the mat during the manufacture thereof. A normally resistant, insulated conductor may be used as the main electric conductor. FIG. 4 also shows a section through the mat.

The thickness and position of the mat on different elements in the same structure may vary according to need. The mat may be used as earth anode and may also be placed in many layers.

Power supply to the mat may take place through metgraphite bands or wires of the same materials or another material which may be over/under or in the mat. Distance and direction of the electric conductors will be determined on the basis of power requirements.

As mentioned, there are used fibres of carbon that have been pressed, blown, woven or knitted together into a mat, wherein the fibres lie in every direction. One distinctive feature of the mat is that the weight thereof will normally be at least 3 g, preferably 15 g and most preferably 100 g/m$^2$.

EXAMPLE

Tests have been carried out on a concrete structure which had previously been protected by means of a conductive coating wherein the fibres had been dispersed in the liquid phase. By incorporating a mat of carbon fibres having a weight of 20 g/m$^2$ in the same conductive coating that had already been used on the structure, an increase in current strength of several decades was obtained at the same voltage.

Tests have also been carried out using the same mat, but where it was embedded in concrete slabs where the reinforcement/concrete ratio was 1:2. For the purposes of comparison, the following samples were made:

Embedded in fresh concrete

Incorporated in conductive coating on the surface of the concrete

Conductive coating on the surface of the concrete

When 1 Volt of current was impressed, the following current strengths were measured:

Embedded in fresh concrete 81 mA

Incorporated in a conductive layer 76 mA

Conductive coating 6 mA.

Tests have also been carried out by placing the mat in fresh concrete which is liable to crack. The mat had an impressive crack preventive effect compared with references tat had no mat.

What is claimed is:

1. A method for cathodic protection against corrosion of a reinforced concrete structure comprising:

bringing into contact a conductive device with a surface of said reinforced concrete structure; and impressing a voltage between said reinforced concrete structure and said conductive device;

wherein said conductive device is a mat comprising conductive carbon fibers and electric conductors.

2. The method of claim 1, wherein said conductive fibers are produced by coating, blowing, pressing, weaving or knitting said conductive fibers onto said mat.

3. The method of claim 2, wherein said conductive fibers lie on the mat in almost every direction and are of different thicknesses.

4. The method of claim 1, wherein said electric conductors are in the form of bands or wires, of at least one conductive material, on top of, under and/or incorporated within said mat.

5. The method according to claim 4, wherein said electric conductors comprise graphite strips, metal strips, graphite bands or bands having metal wires.

6. The method according to claim 5, wherein said electric conductors comprise metal strips and said metal strips are titanium.

7. The method according to claim 4, wherein said conductive material is spun or woven within the mat.

8. The method according to claim 1, wherein the mat is at least 3 g/m$^2$.

9. The method of claim 1, wherein the mat is at least 20 g/m$^2$.

10. The method according to claim 1, wherein the mat is at least 100 g/m$^2$.

11. The method according to claim 1, wherein the mat is applied to the reinforced concrete surface after pretreating said surface and/or after applying a coating, paint or cement slurry.

12. A method for the cathodic protection of concrete or shotcrete; comprising:

embedding a conductive device within said concrete or shotcrete; and impressing a voltage between said concrete and said conductive device;

wherein said conductive device is a mat comprising conductive carbon fibers and electric conductors.

13. The method of claim 12, wherein said conductive fibers are produced by coating, blowing, pressing, weaving or knitting said fibers onto said mat.

14. The method of claim 13, wherein said conductive fibers on the mat lie in almost every direction and are of different thicknesses.

15. The method of claim 12, wherein said electric conductors are in the form of bands or wires of at least one conductive material on top of, under and/or incorporated within said mat.

16. The method according to claim 15, wherein said electric conductors comprise graphite strips, metal strips, graphite bands or bands having metal wires.

17. The method according to claim 16, wherein said electric conductors comprise metal strips and said metal strips are titanium.

18. The method according to claim 15, wherein said conductive material is spun or woven within the mat.

19. The method according to claim 12, wherein the mat is at least 3 g/m$^2$.

20. The method according to claim 12, wherein the mat is at least 20 g/m$^2$.

21. The method according to claim 12, wherein the mat is at least 100 g/m$^2$.

22. A method for the crack prevention of a structure containing concrete or shotcrete comprising:

embedding a conductive device in said concrete or shotcrete;

wherein said conductive device is a mat comprising conductive carbon fibers and electric conductors.

23. The method of claim 22, wherein said conductive fibers are produced by coating, blowing, pressing, weaving or knitting said fibers onto said mat.

24. The method of claim 23, wherein said conductive fibers on the mat lie in almost every direction and are of different thicknesses.

25. The method of claim 22, wherein said electric conductors are in the form of bands or wires of at least one conductive material on top of, under and/or incorporated within said mat.

26. The method according to claim 25, wherein said electric conductors comprise graphite strips, metal strips, graphite bands or bands having metal wires.

27. The method according to claim 26, wherein said electric conductors comprise metal strips and said metal strips are titanium.

28. The method according to claim 25, wherein said conductive material is spun or woven within the mat.

29. The method according to claim 22, wherein the mat is at least 3 g/m$^2$.

30. The method according to claim 22, wherein the mat is at least 20 g/m$^2$.

31. The method according to claim 22, wherein the mat is at least 100 g/m$^2$.

* * * * *